US009424205B2

(12) United States Patent
Marulkar et al.

(10) Patent No.: US 9,424,205 B2
(45) Date of Patent: Aug. 23, 2016

(54) SYSTEM AND METHOD FOR SATA VIRTUALIZATION AND DOMAIN PROTECTION

(71) Applicants: Rajendra Sadananad Marulkar, Pune (IN); Satish Sathe, San Ramon, CA (US); Keyur Chudgar, San Jose, CA (US)

(72) Inventors: Rajendra Sadananad Marulkar, Pune (IN); Satish Sathe, San Ramon, CA (US); Keyur Chudgar, San Jose, CA (US)

(73) Assignee: APPLIED MICRO CIRCUITS CORPORATION, Santa Clara, CA (US)

( * ) Notice: Subject to any disclaimer, the term of this patent is extended or adjusted under 35 U.S.C. 154(b) by 467 days.

(21) Appl. No.: 13/742,767

(22) Filed: Jan. 16, 2013

(65) Prior Publication Data

US 2014/0201481 A1 Jul. 17, 2014

(51) Int. Cl.

| | | |
|---|---|---|
| *G06F 12/16* | (2006.01) | |
| *G06F 12/14* | (2006.01) | |
| *G06F 13/14* | (2006.01) | |
| *G06F 21/80* | (2013.01) | |
| *G06F 9/455* | (2006.01) | |
| *G06F 13/16* | (2006.01) | |
| *G06F 13/40* | (2006.01) | |
| *G06F 12/10* | (2016.01) | |

(52) U.S. Cl.
CPC ............. *G06F 12/16* (2013.01); *G06F 12/145* (2013.01); *G06F 21/80* (2013.01); *G06F 12/1081* (2013.01); *G06F 13/1642* (2013.01); *G06F 13/40* (2013.01); *G06F 2009/45579* (2013.01); *G06F 2009/45583* (2013.01); *G06F 2212/151* (2013.01)

(58) Field of Classification Search
CPC .... G06F 12/10; G06F 3/0662; G06F 3/0658; G06F 3/0659; G06F 9/5077
See application file for complete search history.

(56) References Cited

U.S. PATENT DOCUMENTS

| | | | |
|---|---|---|---|
| 7,216,253 | B2 | 5/2007 | Miller et al. |
| 7,343,517 | B2 | 3/2008 | Miller et al. |
| 7,664,909 | B2 | 2/2010 | Pettey |
| 8,281,054 | B2 | 10/2012 | Day |
| 8,296,513 | B1 | 10/2012 | Liu |
| 2007/0226451 | A1* | 9/2007 | Cheng et al. ............... 711/203 |
| 2007/0283118 | A1* | 12/2007 | Chan et al. ................. 711/165 |
| 2008/0005297 | A1* | 1/2008 | Kjos et al. .................. 709/223 |

* cited by examiner

*Primary Examiner* — Tuan Thai
*Assistant Examiner* — Glenn Gossage
(74) *Attorney, Agent, or Firm* — Amin, Turocy & Watson LLP

(57) ABSTRACT

A hardware SATA virtualization system without the need for backend and frontend drivers and native device drivers is disclosed. A lightweight SATA virtualization handler can run on a specialized co-processor and manage requests enqueued by individual guest devices or virtual machines (VMs). The lightweight SATA virtualization handler can also perform the scheduling or queuing of the requests based on performance optimizations to reduce seek time as well as based on the priority of the requests. The specialized co-processor can communicate to an integrated SATA controller through an advanced host controller interface ("AHCI") data structure that is built by the coprocessor and has commands from one or more VMs. Guest devices or guest operating systems can build associated AHCI data structures in memory, which may be on-chip memory or DDR memory.

19 Claims, 13 Drawing Sheets

SYSTEM AND METHOD FOR SATA VIRTUALIZATION AND DOMAIN PROTECTION

TECHNICAL FIELD

The subject disclosure relates generally to Serial ATA (Serial Advanced Technology Attachment) (SATA) virtualization, and more particularly to facilitating a hardware based system for domain protection and access management to SATA storage resources for one or more virtual machines.

BACKGROUND

Virtualization is a way in which computing resources can be abstracted between a number of users. A virtual machine manager, or a hypervisor, can be placed between the operating system ("OS") and the hardware. Typically, the virtual machine manager executes in a privileged mode, and can host one or more operating systems, or guest OSs, in a sandbox (the virtual machine ("VM")). Each guest OS operates under the illusion of exclusive access to the system processor(s), peripherals, memory, and I/O of the system. The virtual machine manager arbitrates access to all shared resources in a similar way to how a traditional operating system enables the concurrent executions of user processes.

Current virtualization systems adapted for storage are designed for server and enterprise level hardware, such as SCSI and Fiber Channel ("FC") hard drives and controllers. Virtualization with such hardware can include para-virtualization techniques where modifications to the guest OS's kernel are required, and SCSI front end drivers (pvSCSI drivers) communicate with Host OS backend drivers which communicate to native drivers that manage the hardware. Another FC approach is to use FC host bus adapter ("HBA") cards that are enhanced with N_Port ID Virtualization (NPIV). This allows a single HBA card to be used with multiple Guest OS. These approaches however require software intervention, and thus are inefficient due to the increased processor utilization.

An alternative hardware approach, adapted for use with SCSI systems is to use a hardware mechanism called Direct I/O hardware. The Direct I/O hardware sits between the Host OS and the guest OSs and performs the job of address translation and protection that was performed by the software hypervisor in the earlier examples. The current technology is workable only for SCSI and FC hardware storage systems, and is not capable of being adapted for SATA use.

The above-described description is merely intended to provide a contextual overview of current techniques for storage virtualization and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a system comprises a memory configured for storing a data structure associated with a guest device and a coprocessor, communicably coupled to the memory, configured for interfacing between the guest device and a SATA controller. A bus fabric can also be included for redirecting a SATA controller access from the guest device to a corresponding address in the data structure, wherein the coprocessor is further configured for performing an address translation for the access and forwarding the translated access via the bus fabric to the SATA controller.

In another example embodiment, a method comprises storing an advanced host controller interface data structure in a memory, wherein the data structure is associated with a guest operating system. The method also includes redirecting a SATA controller access to the data structure in response to the SATA controller access originating from the guest operating system. The method can also include translating an address for the access and forwarding the translated access via a bus fabric to the SATA controller.

In an example embodiment, a system includes a means for redirecting accesses from a plurality of guest devices to a SATA controller to a designated on-chip memory address. The system also includes a means for queuing the accesses and determining permissions based on source domain IDs associated with the accesses. The system can also include a means for translating the accesses from a virtual address to a physical address and forwarding the accesses to the SATA controller.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
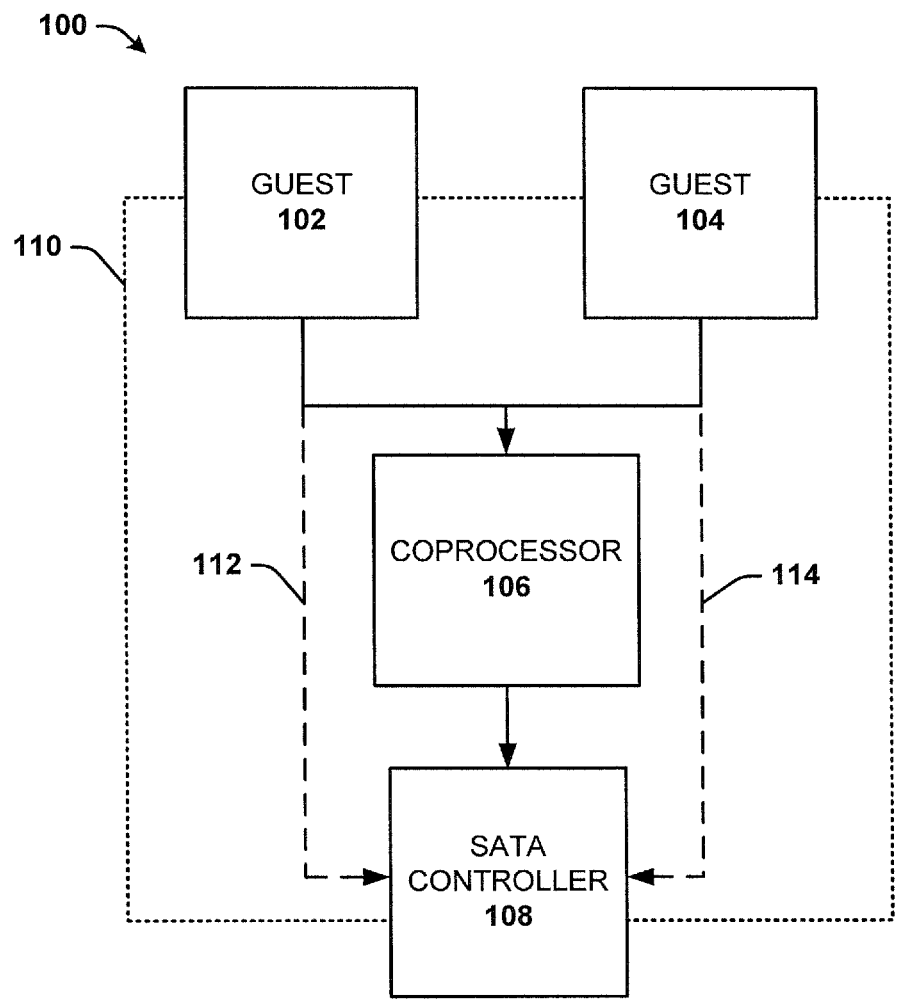
FIG. 1 is a block diagram illustrating an example, non-limiting embodiment of a hardware SATA virtualization system in accordance with various aspects described herein.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Various aspects of the present disclosure provide for a hardware SATA virtualization system without the need for backend and frontend drivers and native device drivers. A lightweight SATA virtualization handler can run on a specialized coprocessor and manage requests enqueued by individual VMs running off of a system processor. The lightweight SATA virtualization handler can also perform the scheduling of the requests based on performance optimizations to reduce seek time as well as based on the priority of the requests. The coprocessor can communicate to an integrated SATA (Serial ATA) controller through an advanced host controller interface ("AHCI") data structure that is built by the coprocessor and has commands from one or more VMs.

Turning now to FIG. 1, a block diagram illustrating an example, non-limiting embodiment of a hardware SATA virtualization system in accordance with various aspects described herein is shown. System 100 includes guest devices 102 and 104 that are communicably coupled via a bus fabric 110 to coprocessor 106 and SATA controller 108.

Each guest OS operates as if it exclusively owns access to the SATA controller during the BIOS setup, device initialization and controller setup phase without the knowledge of the SATA virtualization handler, or hypervisor, associated with the coprocessor 106.

It is to be appreciated that while FIG. 1 depicts two guest devices interacting with the coprocessor 106, in other embodiments there can be one guest device or more than two guest devices. The two guest devices, 102 and 104, shown in FIG. 1, show merely one exemplary embodiment.

As guests 102 and/or 104 issue commands and/or requests 112 and 114 to the SATA controller 108, bus fabric 110 can redirect the commands and/or requests to a designated virtual address in a respective AHCI data structure on a memory (see FIG. 3 and FIG. 5 for additional description) associated with coprocessor 106. The memory can be either on-chip or DDR memory and the AHCI data structures can be built by each of the guest devices 102 and 104 in the memory.

In an embodiment, the coprocessor 106 can perform an address translation for the command and/or request on the memory, and then forward the translated command and/or request to the SATA controller 108. If the bus fabric 110 determines that an access to the SATA controller 108 has been issued by the coprocessor 106 or a hypervisor associated with the coprocessor 106, the bus fabric can let the access proceed to SATA controller 108. This ensures that only the coprocessor 106 has access to the SATA controller 108 during BIOS setup, device initialization, or run time.

In some embodiments of the subject disclosure, no modifications to the guest devices 102 and 104 are necessary, and they are able to operate as if they have full control of the SATA controller, when in fact, the coprocessor 106 is intercepting and relaying the communications. The coprocessor 106 handles the address translation and protection in the memory, which is more efficient than letting software hypervisors perform these tasks.

Figure 2:
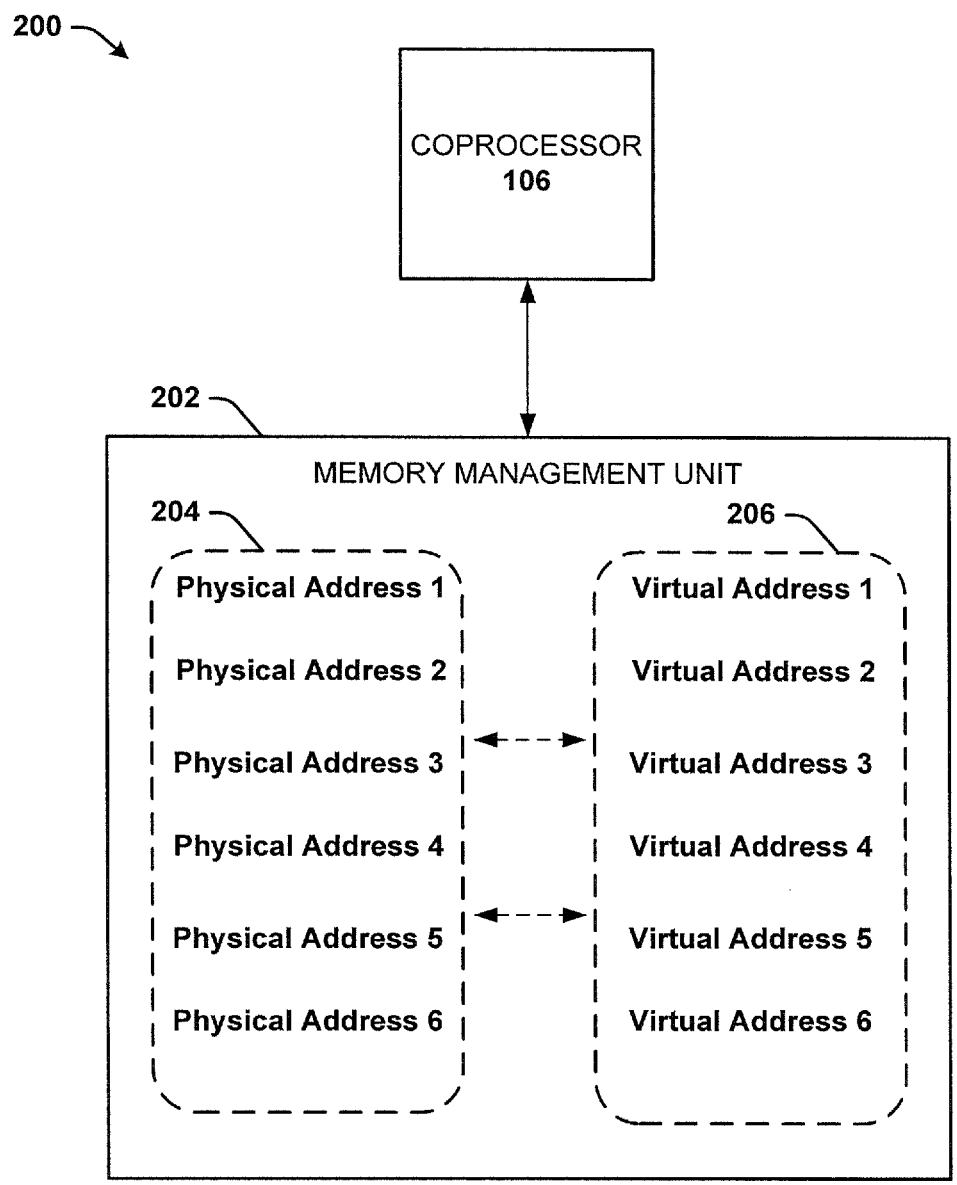
FIG. 2 is a block diagram illustrating an example, non-limiting embodiment of an address translation system in accordance with various aspects described herein.

Referring now to FIG. 2, a block diagram illustrating an example, non-limiting embodiment of an address translation system in accordance with various aspects described herein is shown. System 200 includes the coprocessor 106 that is communicably coupled to a memory management unit 202. The memory management unit 202 is configured for storing address translation tables that map a set of physical addresses 204 to virtual addresses 206 and vice versa. The memory management unit 202 can also map physical addresses 204 and virtual addresses 206 to a set of intermediate physical addresses (not shown).

The coprocessor 106, when performing address translations in the memory for the commands and/or requests issued by the guest devices 102 and 104, can look up the translation tables in memory management unit 202 to assist with performing the translations. Likewise, when SATA controller 108 initiates any transfer to memory, the memory management unit 202 can be used to divert the transfer to the appropriate physical address, which ensures that the transfer gets to the appropriate virtual address for the guest device.

Figure 3:
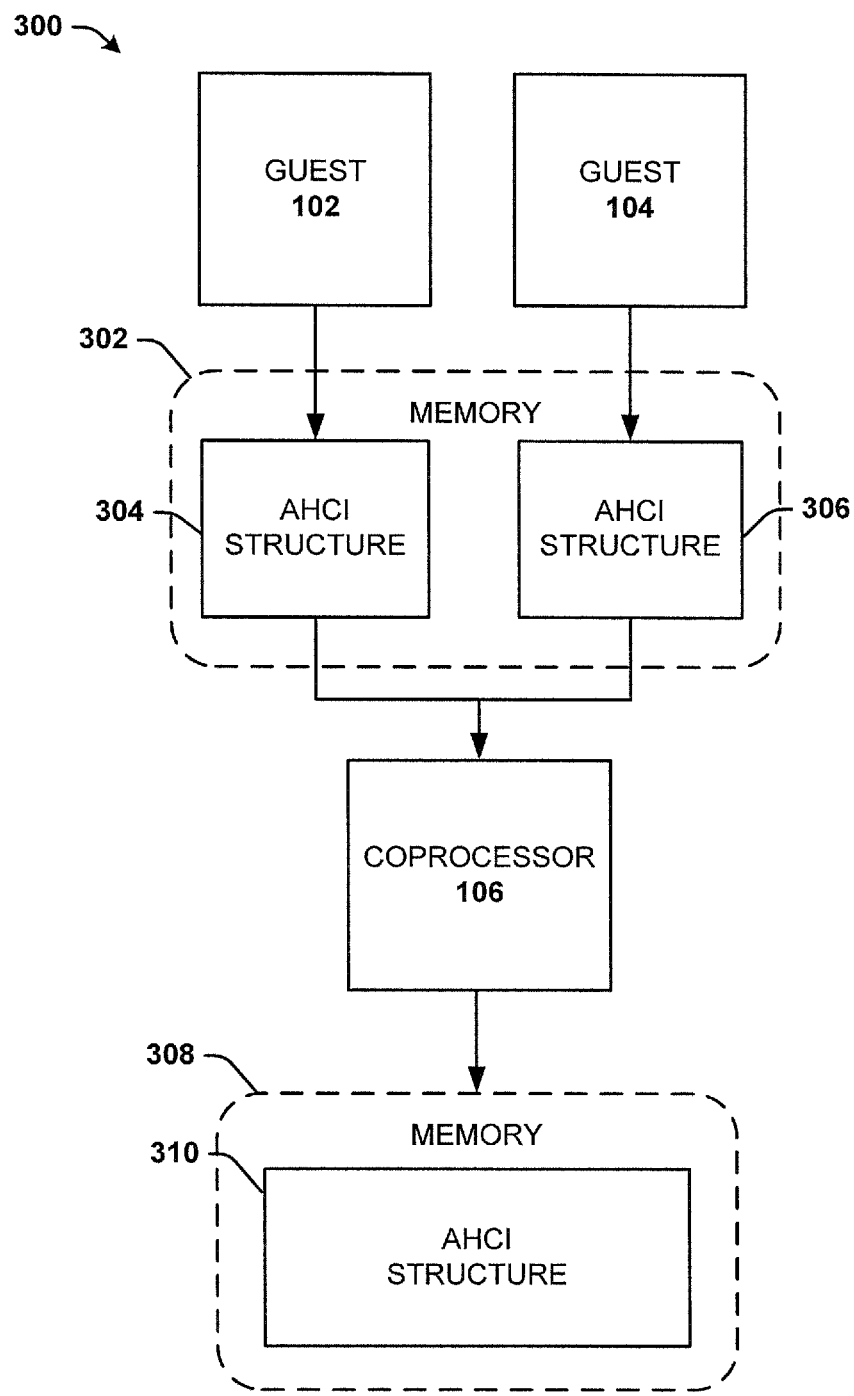
FIG. 3 is a block diagram illustrating an example, non-limiting embodiment of a virtual machine memory management system in accordance with various aspects described herein.

Turning now to FIG. 3, illustrated is a block diagram of an example, non-limiting embodiment of a virtual machine memory management system in accordance with various aspects described herein. System 300 includes a memory 302 in which guest devices 102 and 104 build respective AHCI data structures 304 and 306. Coprocessor 106 can build a consolidated AHCI data structure 310 in memory 308 where data structure 310 is made up of both data structures 304 and 306.

In an embodiment, the coprocessor 106 can take a variety of factors into account when building the consolidated AHCI data structure 310. The factors can include the nature of the SATA commands, priority of the commands, current position of the head, and etc., in order to increase performance.

In some embodiments, memory 302 and memory 308 can be separate memories, either DDR or on-chip memory. In other embodiments, data structure 310 and data structures 304 and 306 can be formed in different locations on the same memory.

In an embodiment, the guest devices 102 and 104 will encode in reserved bits of the AHCI data structures 304 and 306 a source domain ID. The source domain ID can provide information about the source domain and/or which guest device the AHCI data structures are associated with. Coprocessor 106, when creating the consolidated data structure 310, will keep the source domain ID associated with the respective portions of the consolidated data structure 310. Coprocessor 106, when sending communications to the SATA controller 108, will use some of the reserved bits of the AHCI data structure 310 to communicate the source domain ID to the SATA controller 108.

Likewise, in another embodiment, when SATA controller 108 fetches the consolidated data structure 310, generated by the coprocessor 106, the SATA controller 108 will store the source domain ID context for every request. The coprocessor 106 can issue up to 32 AHCI commands and each one can be from a different guest device. When the SATA controller 108 gets a response from the disk, it can insert the source domain ID so that the appropriate address translation and check can happen in the memory management unit 202.

In an embodiment, a similar scheme can be employed for doing LUN (Logical Unit Number) protection in SATA controller 108. The LUN is a number that is used to identify a logical unit, which is a device addressed by SATA protocols. When the SATA controller 108 executes the command, the domain ID to LUN mapping table can ensure that the domain ID has the required permission to execute the command. For example, if a particular domain ID has read, write, and execute permissions for a LUN group, when a command is executed, the SATA controller 108 can check to see whether the domain ID has enough permissions to execute the command, and if so, allow the command to be executed. If the domain ID does not have the required permissions, an error notice can be generated.

Figure 4:
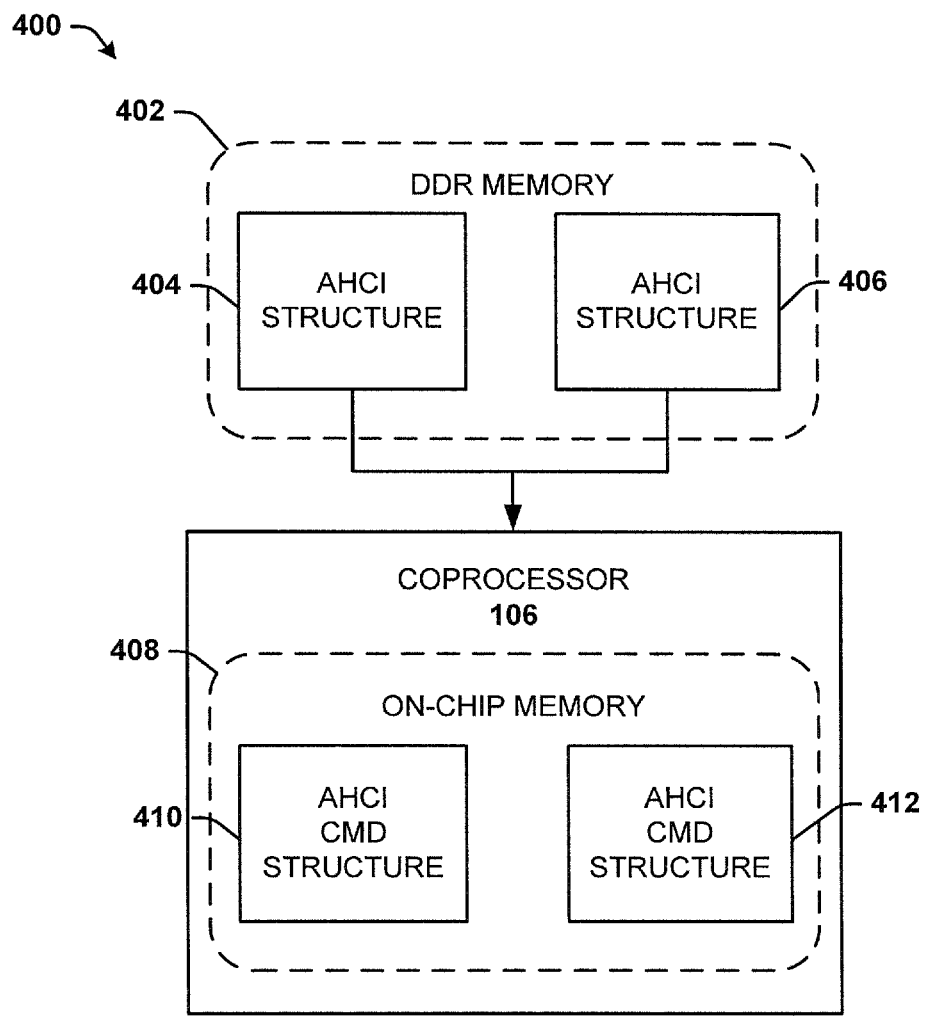
FIG. 4 is a block diagram illustrating an example, non-limiting embodiment of a memory structure copying system in accordance with various aspects described herein.

Turning now to FIG. 4, a block diagram illustrating an example, non-limiting embodiment of a memory structure copying system in accordance with various aspects described herein is shown. System 400 includes a DDR memory 402 with AHCI structures 404 and 406 associated with respective guest devices (e.g., guest devices 102 and 104). Coprocessor 106 copies all or a portion of the AHCI structures 404 and 406 respectively to AHCI structures 410 and 412 on on-chip memory 408.

As previously stated, the memory on which the guest devices 102 and 104 built the AHCI data structures could be either DDR memory or on-chip memory. If the memory was on chip memory, then there is no need for coprocessor 106 to split, or copy the AHCI data structure. If the memory was DDR memory however, all, or a portion of each of the AHCI data structures 404 and 406 can be copied to the on-chip memory 408. If just a portion of the AHCI data structures are copied, the portion copied can include the command headers. Copying the AHCI data structure to the on-chip memory can speed up the parsing of a command frame information structure (CFIS) and can help the coprocessor 106 build the consolidated AHCI data structure 310 (FIG. 3).

Figure 5:
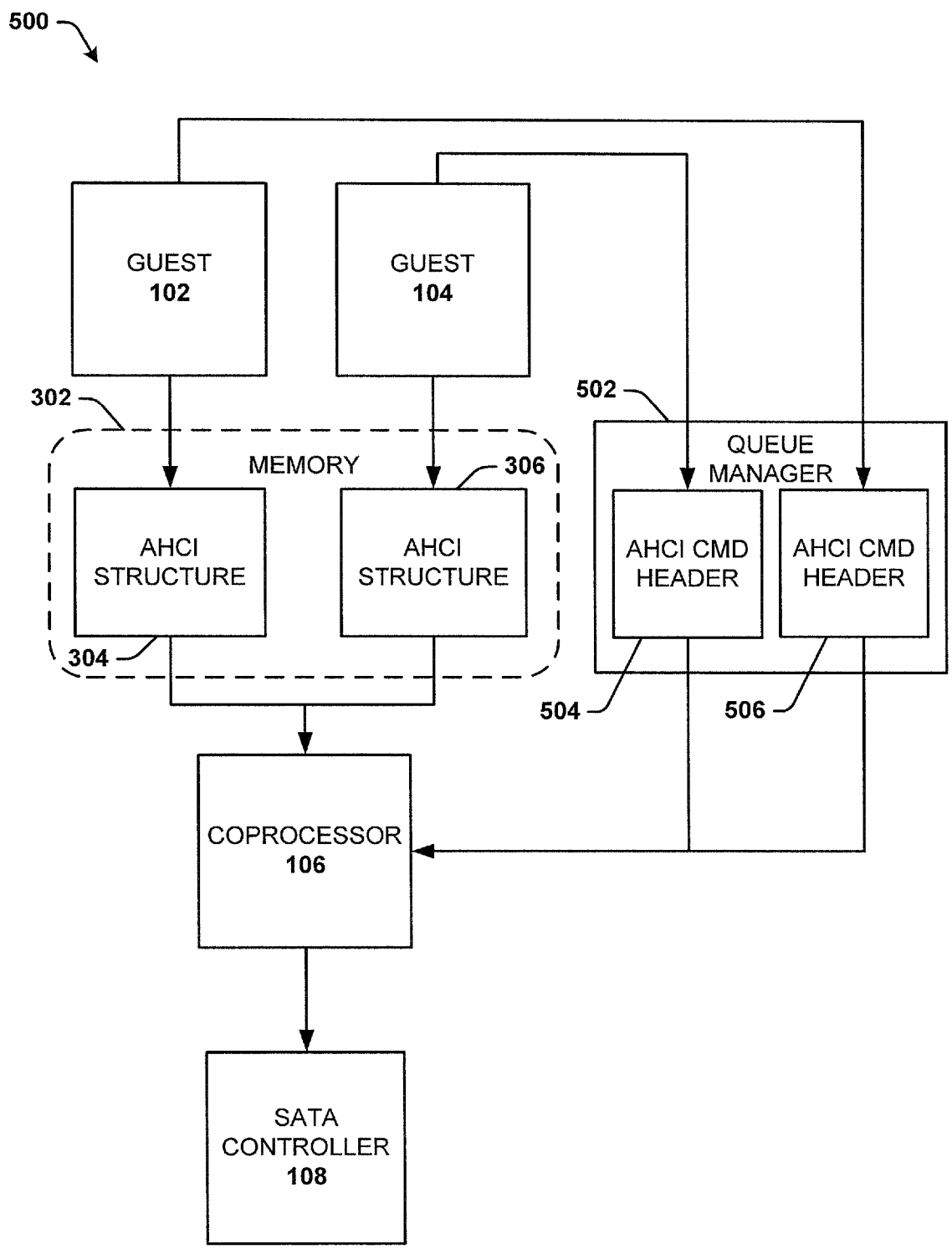
FIG. 5 is a block diagram illustrating another example, non-limiting embodiment of a hardware SATA virtualization system in accordance with various aspects described herein.

FIG. 5 displays a block diagram of another example, non-limiting embodiment of a hardware SATA virtualization system 500 in accordance with various aspects described herein.

As described earlier, guest devices 102 and 104 build AHCI data structures, 304 and 306 respectively, in memory 302. Memory 302 can be either DDR memory or on-chip memory. If the memory is DDR memory, coprocessor 106 can copy a portion on the data structure to on-chip memory on the coprocessor 106. Coprocessor 106 also builds a consolidated AHCI data structure on either DDR memory or on-chip memory as well.

Each of the guest devices 102 and 104 also enqueue command header requests in queues 504 and 506 respectively in the queue manager 502. The coprocessor 106 handles the queue management and arbitration for requests from the guest devices 102 and 104. Accordingly, the coprocessor 106 translates the addresses and forwards the accesses to the SATA controller 108 in an order based on the queues 504 and 506 in the queue manager. The consolidated AHCI data structure 310 is also built by the coprocessor 106 based at least in part on the queues 504 and 506.

In another embodiment, for a CFIS, the SATA controller 108 can interface with the coprocessor 106. The SATA controller 108 can write directly into a FIS pointer provided by the coprocessor 106 along with the source domain ID. Based on the source domain ID, the memory management unit 202 (FIG. 2), can provide the address translation tables to divert the FIS from the SATA controller to the appropriate guest device's FIS area in the AHCI data structure. In another embodiment, the coprocessor 106 can define its own combined received FIS data structure and the SATA controller 108 can write directly to the coprocessor's combined received FIS data structure. The coprocessor 106 can then copy the received FIS data structure to the AHCI data structure associated with one of the guest devices.

In view of the example systems described above, methods that may be implemented in accordance with the described subject matter may be better appreciated with reference to the flow charts of FIGS. 6-11. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 6:
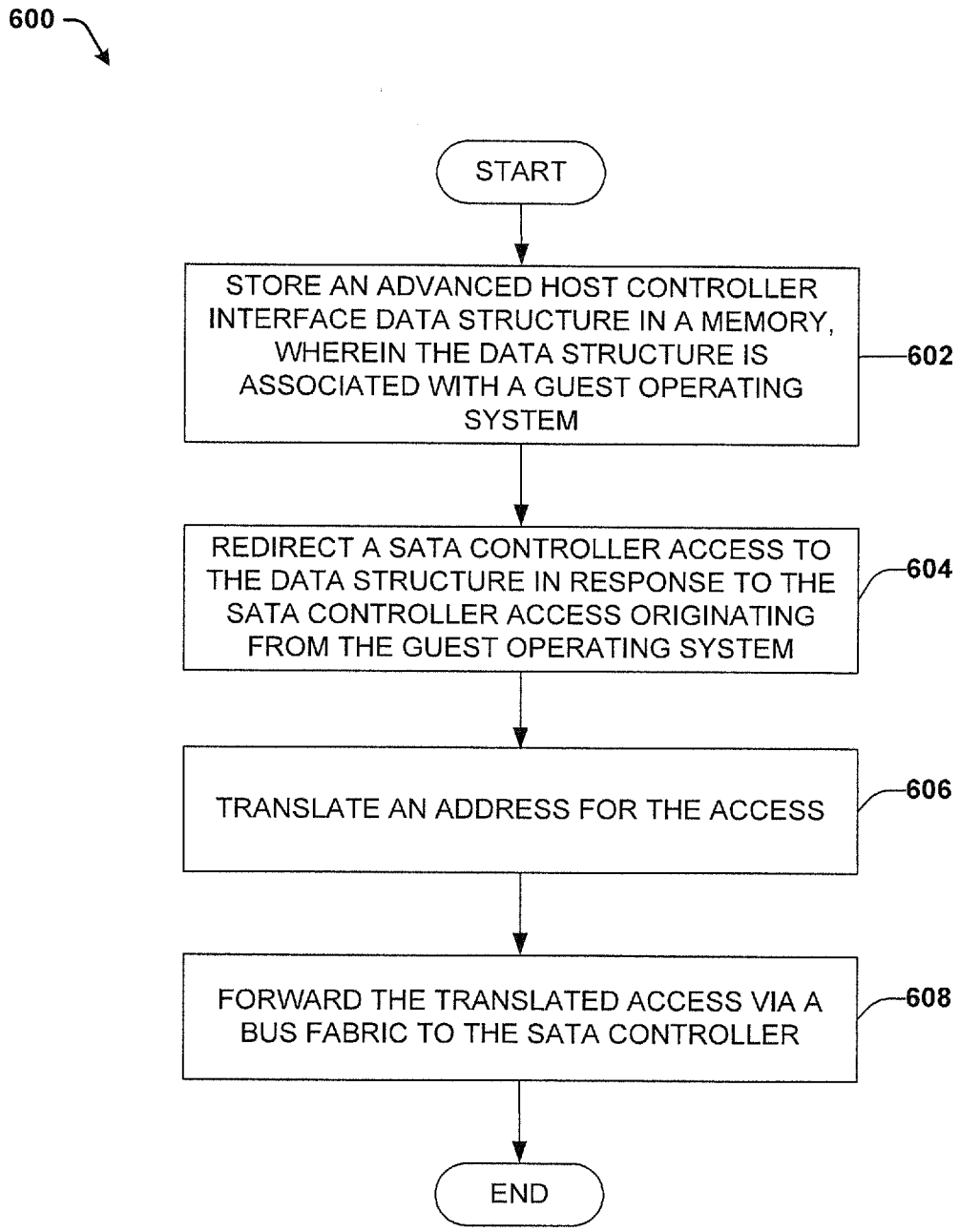
FIG. 6 illustrates a flow diagram of an example, non-limiting embodiment of a method for hardware SATA virtualization.

Referring now to FIG. 6, a flow diagram of an example, non-limiting embodiment of a method for hardware SATA virtualization is shown. Method 600 can begin at block 602, where an advanced host controller interface data structure is stored in a memory, and wherein the data structure is associated with a guest operating system. The guest operating systems can build their associated AHCI data structures in the memory, which can be either DDR memory or on-chip memory. These AHCI data structures can be used by the guest operating systems to provide a framework for communication with a SATA controller. A coprocessor can interface between the memory and the SATA controller.

At block 604, a SATA controller access originating from the guest operating system can be redirected from the bus fabric to the AHCI data structure. The bus fabric can redirect the access to a designated virtual address in the AHCI data structure that corresponds to the guest operating system from which the access originated.

At block 606, an address for the access is translated. The address can be translated from the virtual address to a physical address that will be used by the SATA controller to write to the storage disk. The address translation can be accomplished by a coprocessor that uses a memory management unit with stored address translation tables. At 608, the translated access is forwarded via the bus fabric to the SATA controller.

Figure 7:
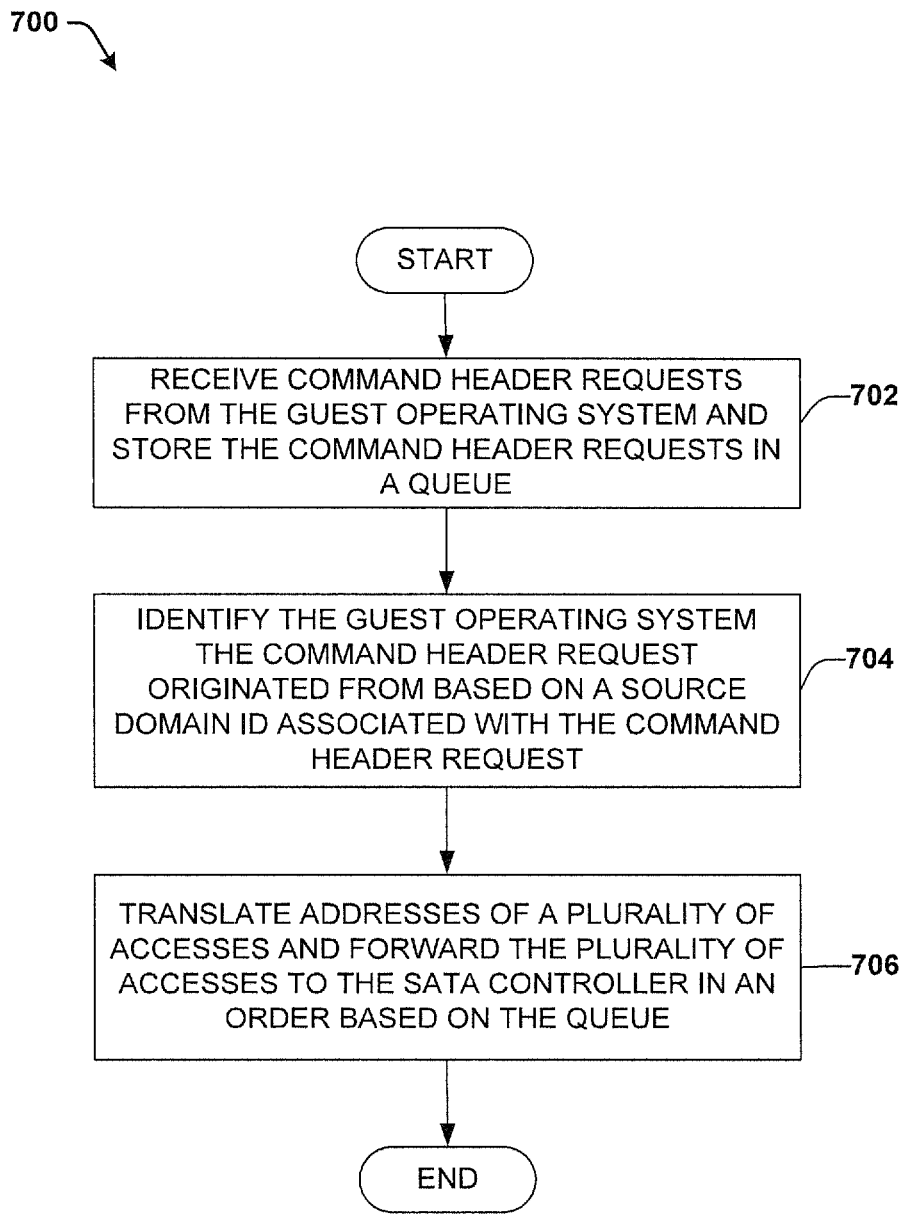
FIG. 7 illustrates a flow diagram of an example, non-limiting embodiment of a method for identifying command header requests and address translating.

Turning now to FIG. 7, a flow diagram of an example, non-limiting embodiment of a method 700 for identifying command header requests and address translating is illustrated. At 702, command header requests are received from the guest operating system and stored in a queue. A queue manager can maintain the queue, and there can be separate queues for each guest operating system.

At 704, the guest operating system that the command header request originated from can be identified based on a source domain ID associated with the command header request. The source domain ID can provide information about the source domain and/or which guest device the AHCI data structures are associated with as well. The coprocessor, when creating a consolidated data structure, will keep the source domain ID from the queue and the AHCI data structure associated with the respective portions of the consolidated data structure. Also, the coprocessor, when sending communications to the SATA controller, will use some of the reserved bits of the AHCI data structure to communicate the source domain ID to the SATA controller. At 706, the addresses of a plurality of accesses are translated and forwarded to the SATA controller in an order based on the queue.

Figure 8:
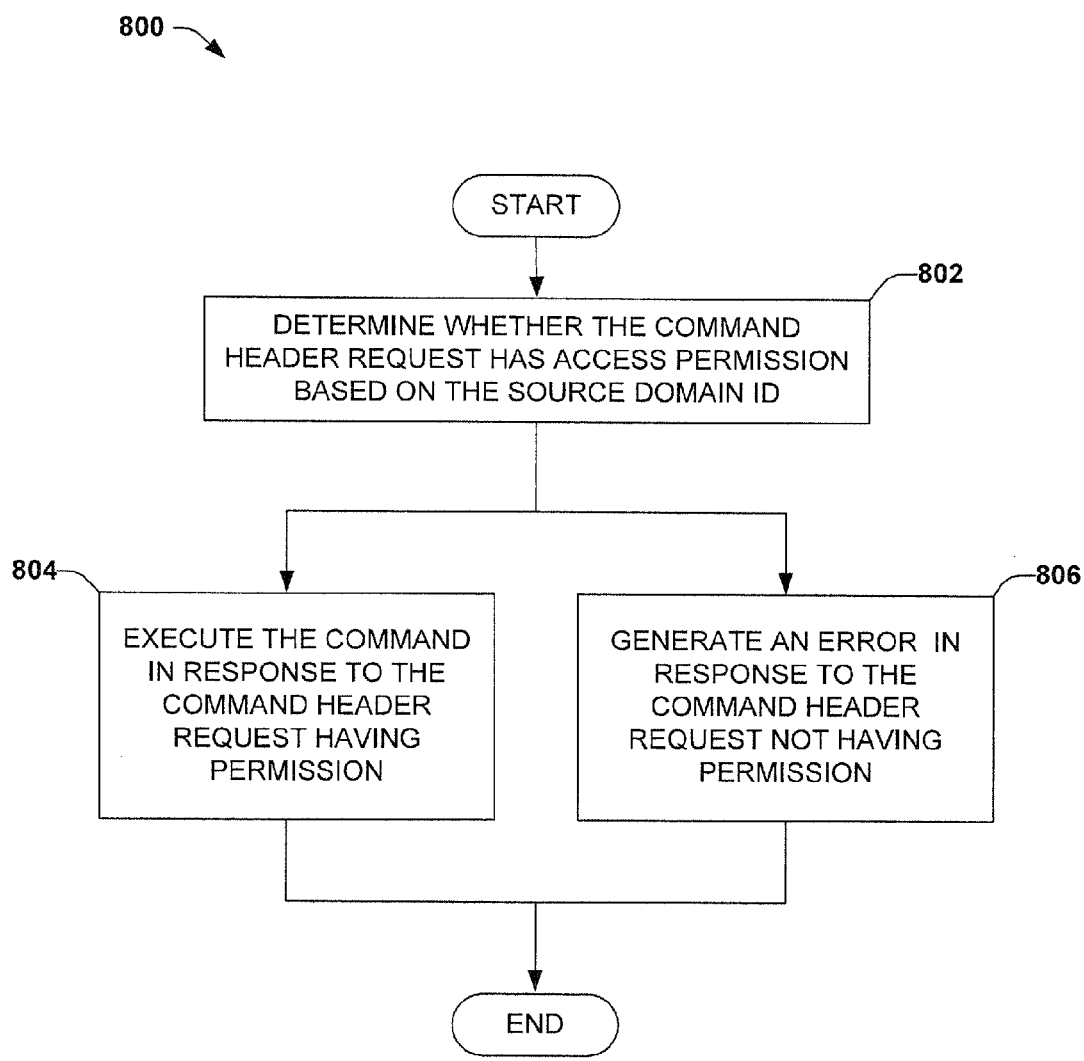
FIG. 8 illustrates a flow diagram of an example, non-limiting embodiment of a method for determining access privileges.

FIG. 8 illustrates a flow diagram of an example, non-limiting embodiment of a method 800 for determining access privileges.

At 802, it is determined whether the command header request has access permission based on the source domain ID. The source domain ID can provide information about which guest operating system and/or source domain the command header request originated from. The source domain ID can be sent along with, or encoded into the command header request. The SATA controller can also receive the source domain ID when it fetches from the consolidated AHCI data structure associated with the coprocessor.

At 804, the command associated with the command header request is executed in response to the command header request having permission. The SATA controller can determine what type of permissions the guest operating system has identified by the source domain ID. The permissions can include read, write, and/or execute for example. If the command header request requests permission to execute a command, but the guest operating system only has permission to read, then at 806 an error is generated since the command header request lacks the requisite permission.

Figure 9:
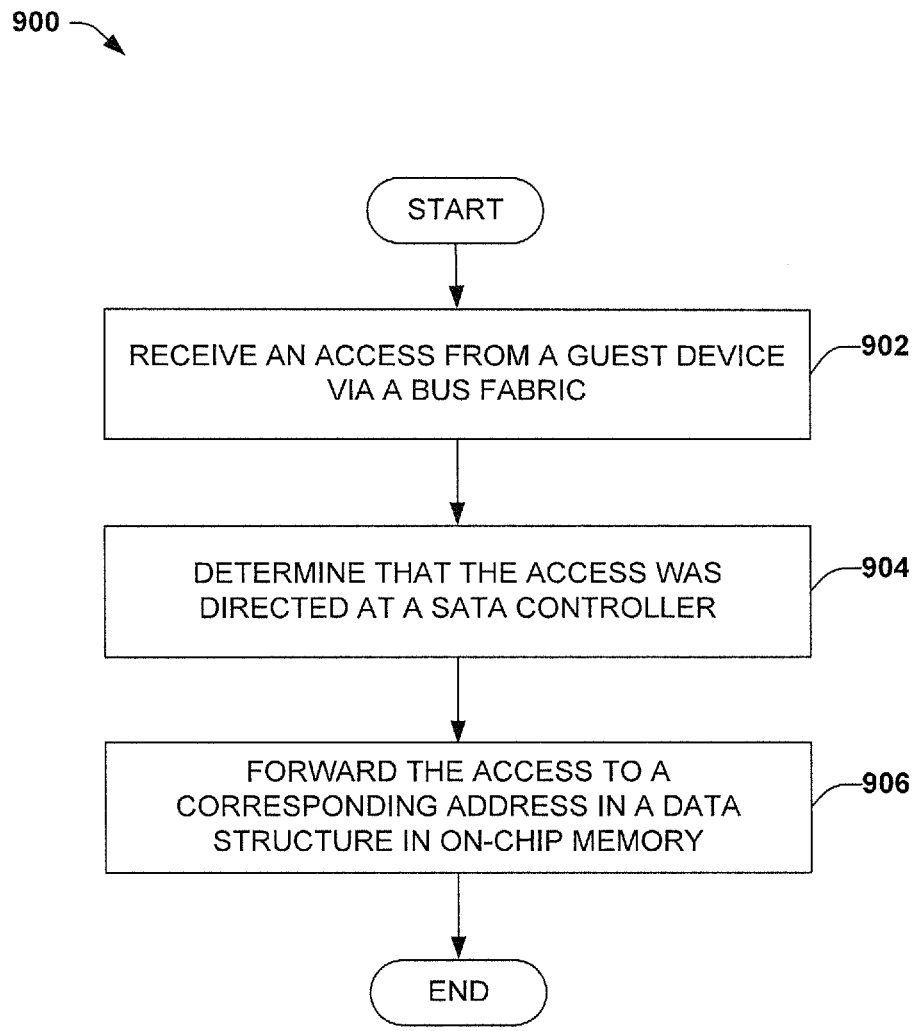
FIG. 9 illustrates a flow diagram of an example, non-limiting embodiment of a method for redirecting accesses from a plurality of guest devices to a SATA controller to a designated on-chip memory address.

FIG. 9 illustrates a flow diagram 900 of an example, non-limiting embodiment of a method for redirecting accesses from a plurality of guest devices to a SATA controller to a designated on-chip memory address.

At 902, an access is received from a guest device via a bus fabric and at 904, it is determined that the access was directed at a SATA controller. Since the access is determined to be directed at a SATA controller, at 906 the access can be forwarded to a corresponding address in a data structure in on-chip memory. In some embodiments, the access can be forwarded to a similar data structure created in DDR memory.

Figure 10:
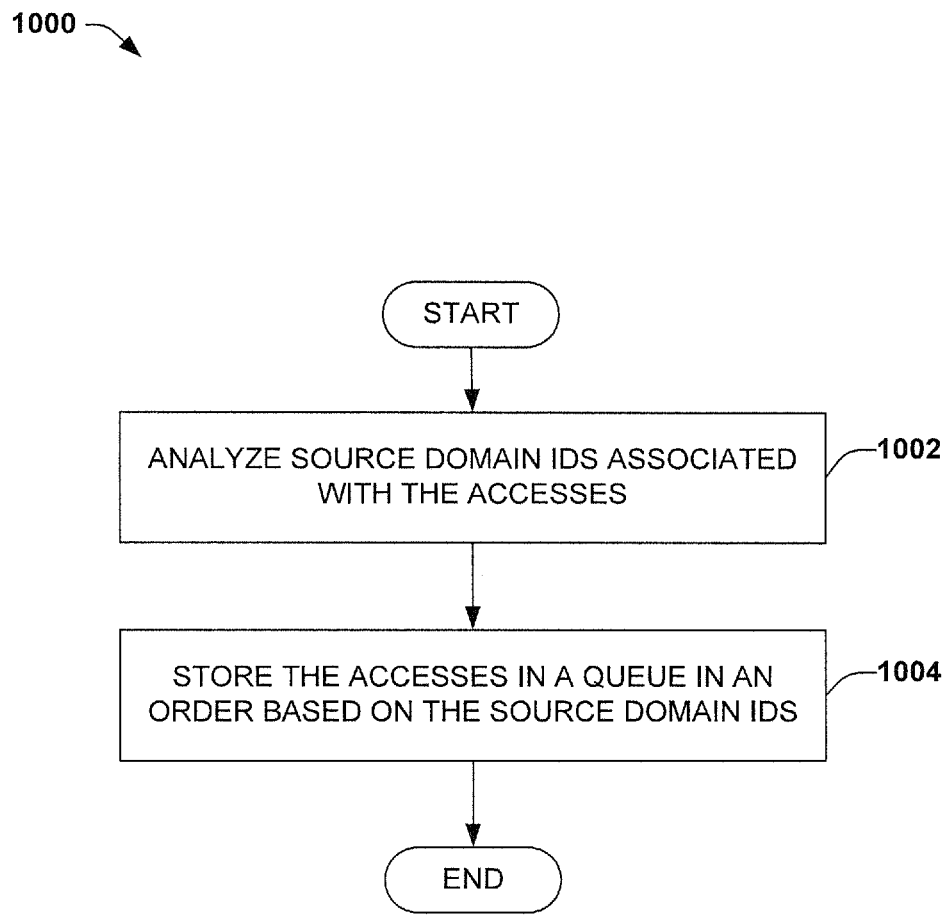
FIG. 10 illustrates a flow diagram of an example, non-limiting embodiment of a method for queuing the accesses and determining permissions based on source domain IDs associated with the accesses.

FIG. 10 illustrates a flow diagram 1000 of an example, non-limiting embodiment of a method for queuing the accesses and determining permissions based on source domain IDs associated with the accesses.

At 1002, source domain IDs associated with the accesses are analyzed. The results of the analysis can provide information relating to permissions and which source domain and/or guest device AHCI data structures are associated with. At 1004, the accesses are stored in a queue in an order based on the source domain ID. The queue can be managed by a queue manager. A coprocessor (e.g. coprocessor 106) handles the queue management and arbitration for requests from the guest devices. Each guest device can have its own queue, and the requests and accesses can be stored based on the order in which they are received.

Figure 11:
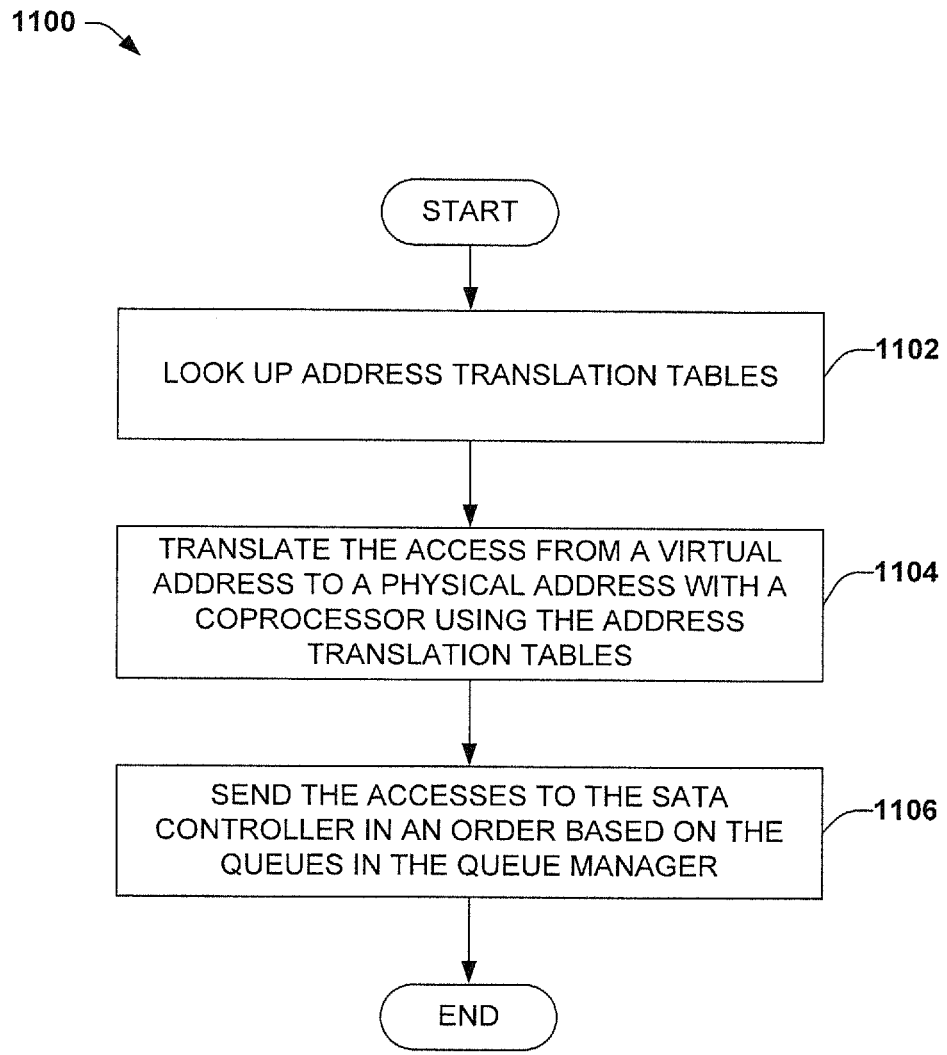
FIG. 11 illustrates a flow diagram of an example, non-limiting embodiment of a method for translating the accesses from a virtual address to a physical address and forwarding the accesses to the SATA controller.

FIG. 11 illustrates a flow diagram 1100 of an example, non-limiting embodiment of a method for translating the accesses from a virtual address to a physical address and forwarding the accesses to the SATA controller.

At 1102, the address tables are looked up and/or accessed. The address tables map a set of physical addresses to virtual addresses and vice versa. The tables can also map physical and virtual addresses to intermediate physical addresses and vice versa. At 1104, the access is translated from a virtual address to a physical address via a coprocessor using the address translation tables. The coprocessor, when performing address translations in the memory for the commands and/or requests issued by the guest devices, can look up the translation tables to assist with performing the translations. This ensures that accesses are diverted to an appropriate physical address accessed by the SATA controller that corresponds to a virtual address used by the guest device. Then, at 1106, the accesses are sent to the SATA controller in an order based on the queues in the queue manager.

Example Computing Environment

Figure 12:
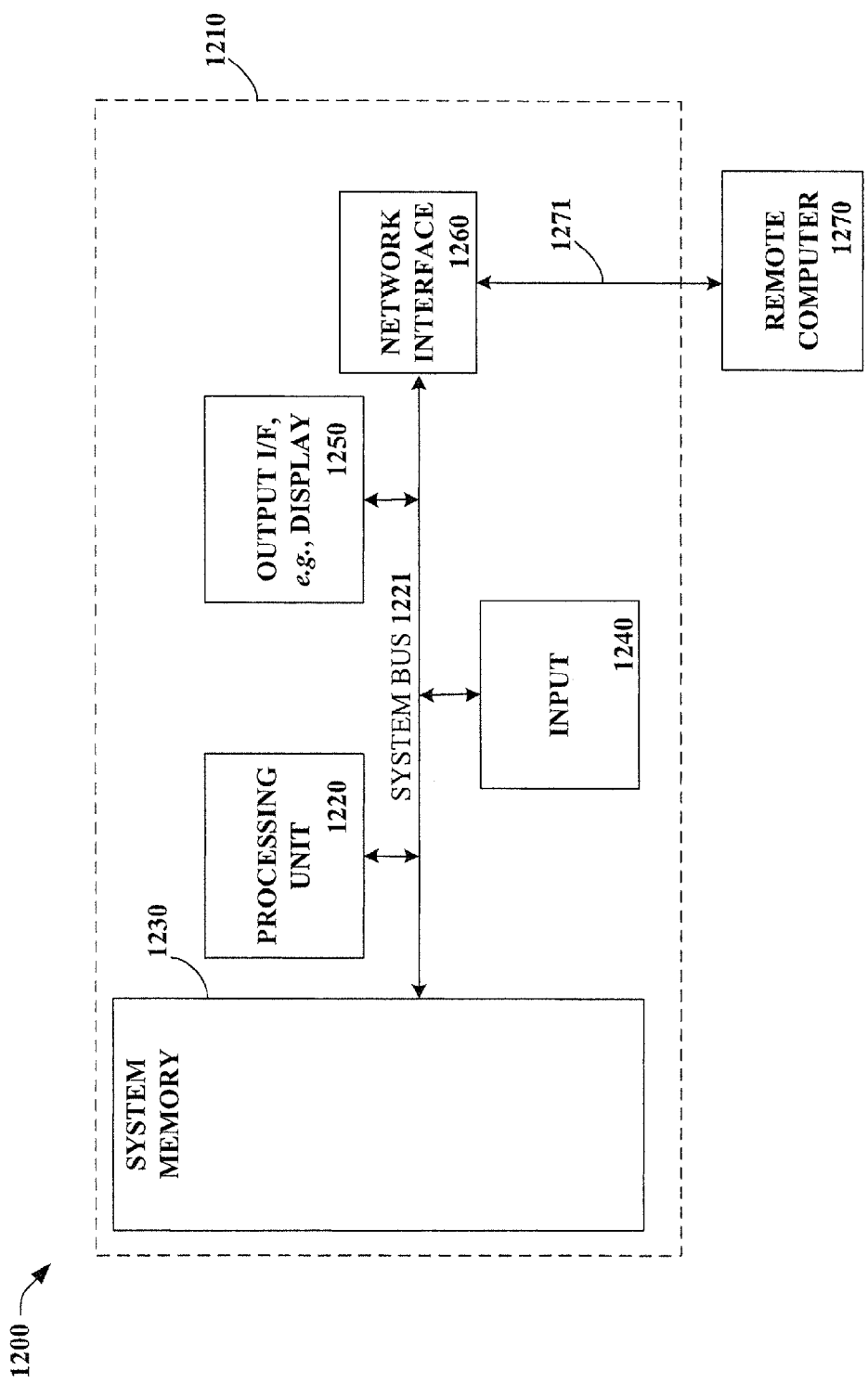
FIG. 12 illustrates a block diagram of an example electronic computing environment that can be implemented in conjunction with one or more aspects described herein.

As mentioned, advantageously, the techniques described herein can be applied to any device where it is desirable to facilitate SATA virtualization. It is to be understood, therefore, that handheld, portable and other computing devices and computing objects of all kinds are contemplated for use in connection with the various non-limiting embodiments, i.e., anywhere that a device may wish to share computing resources with a plurality of guest devices or virtual machines. Accordingly, the general purpose remote computer described below with respect to FIG. 12 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 12 thus illustrates an example of a suitable computing system environment 1200 in which some aspects of the disclosed subject matter can be implemented, although as made clear above, the computing system environment 1200 is only one example of a suitable computing environment for a device and is not intended to suggest any limitation as to the scope of use or functionality of the disclosed subject matter. Neither should the computing environment 1200 be interpreted as having any dependency or requirement relating to any one or combination of components illustrated in the exemplary operating environment 1200.

With reference to FIG. 12, an exemplary device for implementing the disclosed subject matter includes a general-purpose computing device in the form of a computer 1210. Components of computer 1210 may include, but are not limited to, a processing unit 1220, a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures.

Computer 1210 typically includes a variety of computer readable media. Computer readable media can be any available media that can be accessed by computer 1210. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media typically embodies computer readable instructions, data structures, program modules, or other data in a modulated data signal such as a carrier wave or other transport mechanism and includes any information delivery media.

The system memory 1230 may include computer storage media in the form of volatile and/or nonvolatile memory such as read only memory (ROM) and/or random access memory (RAM). A basic input/output system (BIOS), containing the basic routines that help to transfer information between elements within computer 1210, such as during start-up, may be stored in memory 1230. Memory 1230 typically also contains data and/or program modules that are immediately accessible to and/or presently being operated on by processing unit 1220. By way of example, and not limitation, memory 1230 may also include an operating system, application programs, other program modules, and program data.

The computer 1210 may also include other removable/non-removable, volatile/nonvolatile computer storage media. For example, computer 1210 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1221 through a non-removable memory interface, and a magnetic disk drive or optical disk drive is typically connected to the system bus 1221 by a removable memory interface.

A user can enter commands and information into the computer 1210 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1220 through user input 1240 and associated interface(s) that are coupled to the system bus 1221, but may be connected by other interface and bus structures, such as a parallel port, game port, or a universal serial bus (USB). A graphics subsystem can also be connected to the system bus 1221. A projection unit in a projection display device, or a HUD in a viewing device or other type of display device can also be connected to the system bus 1221 via an interface, such as output interface 1250, which may in turn communicate with video memory. In addition to a monitor, computers can also include other peripheral output devices such as speakers which can be connected through output interface 1250.

The computer 1210 can operate in a networked or distributed environment using logical connections to one or more other remote computer(s), such as remote computer 1270, which can in turn have media capabilities different from device 1210. The remote computer 1270 can be a personal computer (PC), a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1210. The logical connections depicted in FIG. 12 include a network 1271, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1210 can be connected to the LAN 1271 through a network interface or adapter. When used in a WAN networking environment, the computer 1210 can typically include a communications component, such as a modem, or other means for establishing communications over the WAN, such as the Internet. A communications component, such as wireless communications component, a modem and so on, which can be internal or external, can be connected to the system bus 1221 via the user input interface of input 1240, or other appropriate mechanism. In a networked environment, program modules depicted relative to the computer 1210, or portions thereof, can be stored in a remote memory storage device. It will be appreciated that the network connections shown and described are exemplary and other means of establishing a communications link between the computers can be used.

Example Networking Environment

Figure 13:
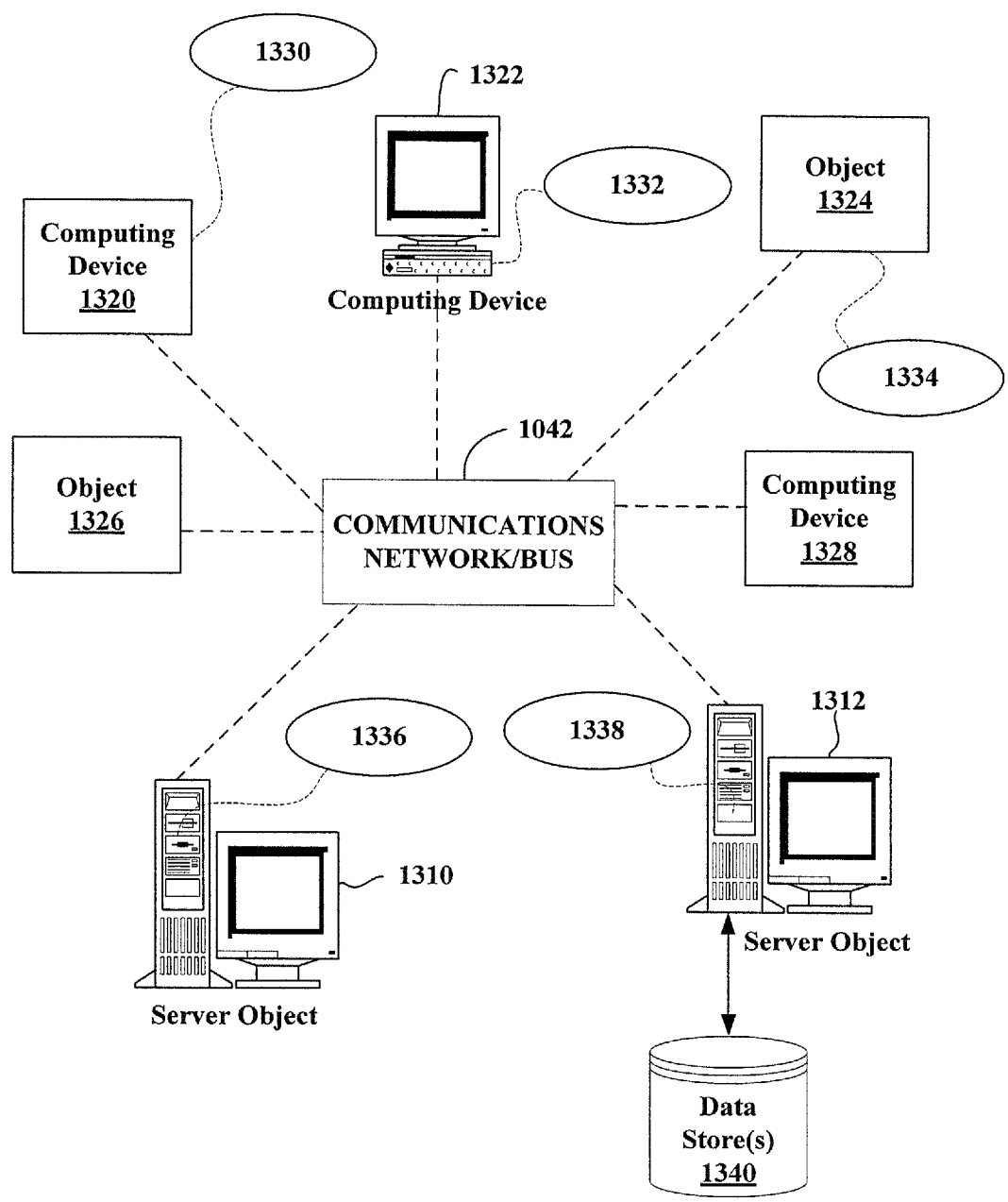
FIG. 13 illustrates a block diagram of an example data communication network that can be operable in conjunction with various aspects described herein.

FIG. 13 provides a schematic diagram of an exemplary networked or distributed computing environment. The distributed computing environment comprises computing objects 1310, 1312, etc. and computing objects or devices 1320, 1322, 1324, 1326, 1328, etc., which may include programs, methods, data stores, programmable logic, etc., as represented by applications 1330, 1332, 1334, 1336, 1338 and data store(s) 1340. It can be appreciated that computing objects 1310, 1312, etc. and computing objects or devices 1320, 1322, 1324, 1326, 1328, etc. may comprise different devices, including a multimedia display device 100 as shown in FIG. 1 or similar devices depicted within the illustrations, or other devices such as a mobile phone, personal digital assistant (PDA), audio/video device, MP3 players, personal computer, laptop, etc.

Each computing object 1310, 1312, etc. and computing objects or devices 1320, 1322, 1324, 1326, 1328, etc. can communicate with one or more other computing objects 1310, 1312, etc. and computing objects or devices 1320, 1322, 1324, 1326, 1328, etc. by way of the communications network 1342, either directly or indirectly. Even though illustrated as a single element in FIG. 13, communications network 1342 may comprise other computing objects and computing devices that provide services to the system of FIG. 13, and/or may represent multiple interconnected networks, which are not shown. Each computing object 1310, 1312, etc. or computing object or devices 1320, 1322, 1324, 1326, 1328, etc. can also contain an application, such as applications 1330, 1332, 1334, 1336, 1338, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the system's automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 13, as a non-limiting example, computing objects or devices 1320, 1322, 1324, 1326, 1328, etc. can be thought of as clients and computing objects 1310, 1312, etc. can be thought of as servers where computing objects 1310, 1312, etc., acting as servers provide data services, such as receiving data from client computing objects or devices 1320, 1322, 1324, 1326, 1328, etc., storing of data, processing of data, transmitting data to client computing objects or devices 1320, 1322, 1324, 1326, 1328, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1342 or bus is the Internet, for example, the computing objects 1310, 1312, etc. can be Web servers with which other computing objects or devices 1320, 1322, 1324, 1326, 1328, etc. communicate via any of a number of known protocols, such as the hypertext transfer protocol (HTTP). Computing objects 1310, 1312, etc. acting as servers may also serve as clients, e.g., computing objects or devices 1320, 1322, 1324, 1326, 1328, etc., as may be characteristic of a distributed computing environment.

Reference throughout this specification to "one embodiment," "an embodiment," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As referenced herein, SATA, (Serial Advanced Technology Attachment) is a computer bus interface for connecting host bus adapters to mass storage devices such as hard disk drives and optical drives. SATA replaces an older standard interface, Parallel ATA (PATA), and offers advantages such as reduced cable size and cost, (7 conductors instead of 40) native hot-swapping, faster data transfer through higher signalling rates, and more efficient transfer through an optional I/O queuing protocol.

SCSI (Small Computer System Interface) is a set of standards for physically connecting and transferring data between computers and peripheral devices. The SCSI standards define commands, protocols, and electrical and optical interfaces. SCSI is most commonly used for hard disks and tape drives, but it can connect a wide range of other devices, including scanners and CD drives, although not all controllers can handle all devices. The SCSI standard defines command sets for specific peripheral device types; the presence of "unknown" as one of these types means that in theory it can be used as an interface to almost any device, but the standard is highly pragmatic and addressed toward commercial requirements As utilized herein, terms "component," "system," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system, comprising:
   a memory configured for storing a data structure associated with a guest device;
   a coprocessor, communicably coupled to the memory, configured for interfacing between the guest device and a SATA controller; and
   a bus fabric configured for redirecting a SATA controller access from the guest device to a corresponding address in the data structure, wherein the coprocessor is further configured for performing an address translation for the access and forwarding the translated access via the bus fabric to the SATA controller.

2. The system of claim 1, wherein the bus fabric allows a SATA controller access originating from the coprocessor to proceed.

3. The system of claim 1, further comprising a memory management unit configured for storing address translation tables, and linking a physical address to a corresponding virtual address and an intermediate physical address.

4. The system of claim 3, wherein the memory management unit is configured for receiving memory accesses from the SATA controller and diverting the memory accesses to a physical address corresponding to an appropriate virtual address.

5. The system of claim 1, further comprising a queue manager configured for receiving command header requests from the guest device and storing them in a queue in the queue manager.

6. The system of claim 5, wherein the coprocessor is configured for translating addresses and forwarding translated accesses to the SATA controller in an order that is based on the queue in the queue manager.

7. The system of claim 5, wherein the command header requests are associated with a source domain ID that identifies the guest device from which each command header request originated.

8. The system of claim 7, wherein the SATA controller is configured for checking whether a command header request has access permission based on the source domain ID, and is further configured for generating an error notification in response to a command header request lacking permission.

9. The system of claim 1, wherein the memory is at least one of DDR memory or on-chip memory.

10. The system of claim 9, wherein in response to the guest device storing the data structure in DDR memory, the coprocessor is configured for copying a portion of the data structure to an on-chip memory.

11. The system of claim 1, wherein the coprocessor is configured for building a consolidated data structure in the memory based on data structures associated with a plurality of guest devices.

12. A method, comprising:
storing an advanced host controller interface data structure in a memory, wherein the data structure is associated with a guest operating system;
redirecting a SATA controller access to the data structure in response to the SATA controller access originating from the guest operating system;
translating an address for the access; and
forwarding the translated access via a bus fabric to the SATA controller.

13. The method of claim 12, further comprising:
receiving an access from the SATA controller; and
translating an address of the access received from the SATA controller to a physical address that corresponds to a specific virtual address.

14. The method of claim 12, further comprising building a consolidated data structure in the memory based on data structures associated with a plurality of guest operating systems.

15. The method of claim 12, further comprising copying a subset of the data structure to on-chip memory in response to the data structure being stored in DDR memory.

16. The method of claim 12, further comprising receiving a command header request from the guest operating system and storing the command header request in a queue.

17. The method of claim 16, further comprising translating addresses of a plurality of accesses and forwarding the translated plurality of accesses to the SATA controller in an order based on the queue.

18. The method of claim 16, further comprising identifying the guest operating system that the command header request originated from based on a source domain ID associated with the command header request.

19. The method of claim 18, further comprising:
determining whether the command header request has access permission based on the source domain ID;
executing an associated command in response to the command header request having permission; and
generating an error in response to the command header request not having permission.

* * * * *